US012650503B2

(12) United States Patent
Deng et al.

(10) Patent No.: US 12,650,503 B2
(45) Date of Patent: Jun. 9, 2026

(54) SYSTEM AND METHOD FOR RADAR RANGE WALK COMPENSATION IN RADAR SYSTEMS

(71) Applicant: UHNDER, INC., Austin, TX (US)

(72) Inventors: Christopher Deng, Redondo Beach, CA (US); Murtaza Ali, Cedar Park, TX (US); Paul W. Dent, Pittsboro, NC (US); Aria Eshraghi, Austin, TX (US); Monier Maher, St. Louis, MO (US)

(73) Assignee: Robert Bosch GmbH, Gerlingen (DE)

( * ) Notice: Subject to any disclaimer, the term of this patent is extended or adjusted under 35 U.S.C. 154(b) by 274 days.

(21) Appl. No.: 18/336,519

(22) Filed: Jun. 16, 2023

(65) Prior Publication Data

US 2023/0408640 A1      Dec. 21, 2023

Related U.S. Application Data

(60) Provisional application No. 63/353,044, filed on Jun. 17, 2022.

(51) Int. Cl.
  G01S 13/32      (2006.01)
  G01S 7/02       (2006.01)
      (Continued)

(52) U.S. Cl.
  CPC ............ G01S 13/325 (2013.01); G01S 7/023 (2013.01); G01S 7/352 (2013.01); G01S 7/356 (2021.05);
      (Continued)

(58) Field of Classification Search
  CPC combination set(s) only.
  See application file for complete search history.

(56) References Cited

U.S. PATENT DOCUMENTS

| | | | |
|---|---|---|---|
| 1,882,128 | A | 10/1932 | Fearing |
| 3,374,478 | A | 3/1968 | Blau |

(Continued)

FOREIGN PATENT DOCUMENTS

| | | |
|---|---|---|
| EP | 0509843 | 10/1992 |
| EP | 1826586 | 8/2007 |

(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Vladimir Magloire
*Assistant Examiner* — Eric K Hodac
(74) *Attorney, Agent, or Firm* — Gardner, Linn, Burkhart & Ondersma LLP

(57)      ABSTRACT

A radar system that uses a range walk compensation algorithm to reduce system losses resulting from moving targets. During the coherent integration of pulse radar systems, the conventional Fast Fourier Transform (FFT) for Doppler processing needs to change the input range bin number in accordance to the velocity of the target. The algorithm allows for configuration of Doppler groups to compute several Dopplers with one FFT. Each Doppler group has a transform Doppler that is close to the center of the group which will dictate the change of range bins for the input data to the FFT. As the range bins are changed, there are two input filter techniques: nearest bin select, and 2-tap filter. After range walk compensation processes all Doppler groups by FFT, the resultant output block has much higher coherent integration as compared to just a conventional FFT.

15 Claims, 12 Drawing Sheets

(51) Int. Cl.
|  |  |
|---|---|
| *G01S 7/35* | (2006.01) |
| *G01S 13/34* | (2006.01) |
| *G01S 13/58* | (2006.01) |
| *G01S 13/931* | (2020.01) |

(52) U.S. Cl.
CPC ............ *G01S 13/34* (2013.01); *G01S 13/584* (2013.01); *G01S 13/931* (2013.01); *G01S 2013/93271* (2020.01); *G01S 2013/93272* (2020.01)

(56) References Cited

U.S. PATENT DOCUMENTS

| | | | |
|---|---|---|---|
| 3,735,398 | A | 5/1973 | Ross |
| 3,750,169 | A | 7/1973 | Strenglein |
| 3,766,554 | A | 10/1973 | Tresselt |
| 3,896,434 | A | 7/1975 | Sirven |
| 3,932,871 | A | 1/1976 | Foote |
| 4,078,234 | A | 3/1978 | Fishbein et al. |
| 4,176,351 | A | 11/1979 | De Vita et al. |
| 4,308,536 | A | 12/1981 | Sims, Jr. et al. |
| 4,566,010 | A | 1/1986 | Collins |
| 4,612,547 | A | 9/1986 | Itoh |
| 4,882,668 | A | 11/1989 | Schmid et al. |
| 4,910,464 | A | 3/1990 | Trett et al. |
| 4,939,685 | A | 7/1990 | Feintuch |
| 5,001,486 | A | 3/1991 | Bächtiger |
| 5,012,254 | A | 4/1991 | Thompson |
| 5,034,906 | A | 7/1991 | Chang |
| 5,087,918 | A | 2/1992 | May et al. |
| 5,151,702 | A | 9/1992 | Urkowitz |
| 5,170,331 | A | 12/1992 | Svehaug |
| 5,175,710 | A | 12/1992 | Hutson |
| 5,218,619 | A | 6/1993 | Dent |
| 5,272,663 | A | 12/1993 | Jones et al. |
| 5,280,288 | A | 1/1994 | Sherry et al. |
| 5,302,956 | A | 4/1994 | Asbury et al. |
| 5,341,141 | A | 8/1994 | Frazier et al. |
| 5,345,470 | A | 9/1994 | Alexander |
| 5,361,072 | A | 11/1994 | Barrick et al. |
| 5,376,939 | A | 12/1994 | Urkowitz |
| 5,379,322 | A | 1/1995 | Kosaka et al. |
| 5,436,872 | A | 7/1995 | Gilmour et al. |
| 5,497,162 | A | 3/1996 | Kaiser |
| 5,508,706 | A | 4/1996 | Tsou et al. |
| 5,581,464 | A | 12/1996 | Woll et al. |
| 5,654,715 | A | 8/1997 | Hayashikura et al. |
| 5,657,021 | A | 8/1997 | Ehsani-Nategh et al. |
| 5,657,023 | A | 8/1997 | Lewis et al. |
| 5,682,605 | A | 10/1997 | Salter |
| 5,691,724 | A | 11/1997 | Aker et al. |
| 5,712,640 | A | 1/1998 | Andou |
| 5,724,041 | A | 3/1998 | Inoue et al. |
| 5,847,661 | A | 12/1998 | Ricci |
| 5,892,477 | A | 4/1999 | Wehling |
| 5,917,430 | A | 6/1999 | Greneker, III et al. |
| 5,920,285 | A | 7/1999 | Benjamin |
| 5,931,893 | A | 8/1999 | Dent et al. |
| 5,959,571 | A | 9/1999 | Aoyagi et al. |
| 5,970,400 | A | 10/1999 | Dwyer |
| 6,048,315 | A | 4/2000 | Chiao et al. |
| 6,067,314 | A | 5/2000 | Azuma |
| 6,069,581 | A | 5/2000 | Bell et al. |
| 6,121,872 | A | 9/2000 | Weishaupt |
| 6,121,918 | A | 9/2000 | Tullsson |
| 6,151,366 | A | 11/2000 | Yip |
| 6,163,252 | A | 12/2000 | Nishiwaki |
| 6,184,829 | B1 | 2/2001 | Stilp |
| 6,191,726 | B1 | 2/2001 | Tullsson |
| 6,208,248 | B1 | 3/2001 | Ross |
| 6,288,672 | B1 | 9/2001 | Asano et al. |
| 6,307,622 | B1 | 10/2001 | Lewis |
| 6,335,700 | B1 | 1/2002 | Ashihara |
| 6,347,264 | B2 | 2/2002 | Nicosia et al. |
| 6,396,436 | B1 | 5/2002 | Lissel et al. |
| 6,400,308 | B1 | 6/2002 | Bell et al. |
| 6,411,250 | B1 | 6/2002 | Oswald et al. |
| 6,417,796 | B1 | 7/2002 | Bowlds |
| 6,424,289 | B2 | 7/2002 | Fukae et al. |
| 6,529,931 | B1 | 3/2003 | Besz et al. |
| 6,547,733 | B2 | 4/2003 | Hwang et al. |
| 6,583,753 | B1 | 6/2003 | Reed |
| 6,614,387 | B1 | 9/2003 | Deadman |
| 6,624,784 | B1 | 9/2003 | Yamaguchi |
| 6,674,908 | B1 | 1/2004 | Aronov |
| 6,683,560 | B2 | 1/2004 | Bauhahn |
| 6,693,582 | B2 | 2/2004 | Steinlechner et al. |
| 6,714,956 | B1 | 3/2004 | Liu et al. |
| 6,747,595 | B2 | 6/2004 | Hirabe |
| 6,768,391 | B1 | 7/2004 | Dent et al. |
| 6,865,218 | B1 | 3/2005 | Sourour |
| 6,867,732 | B1 | 3/2005 | Chen et al. |
| 6,888,491 | B2 | 5/2005 | Richter |
| 6,975,246 | B1 | 12/2005 | Trudeau |
| 7,066,886 | B2 | 6/2006 | Song et al. |
| 7,119,739 | B1 | 10/2006 | Struckman |
| 7,130,663 | B2 | 10/2006 | Guo |
| 7,202,776 | B2 | 4/2007 | Breed |
| 7,289,058 | B2 | 10/2007 | Shima |
| 7,299,251 | B2 | 11/2007 | Skidmore et al. |
| 7,338,450 | B2 | 3/2008 | Kristofferson et al. |
| 7,395,084 | B2 | 7/2008 | Anttila |
| 7,460,055 | B2 | 12/2008 | Nishijima et al. |
| 7,474,258 | B1 | 1/2009 | Arikan et al. |
| 7,545,310 | B2 | 6/2009 | Matsuoka |
| 7,545,321 | B2 | 6/2009 | Kawasaki |
| 7,564,400 | B2 | 7/2009 | Fukuda |
| 7,567,204 | B2 | 7/2009 | Sakamoto |
| 7,609,198 | B2 | 10/2009 | Chang |
| 7,642,952 | B2 | 1/2010 | Fukuda |
| 7,663,533 | B2 | 2/2010 | Toennesen |
| 7,667,637 | B2 | 2/2010 | Pedersen et al. |
| 7,728,762 | B2 | 6/2010 | Sakamoto |
| 7,791,528 | B2 | 9/2010 | Klotzbuecher |
| 7,847,731 | B2 | 12/2010 | Wiesbeck et al. |
| 7,855,677 | B2 | 12/2010 | Negoro et al. |
| 7,859,450 | B2 | 12/2010 | Shirakawa et al. |
| 8,019,352 | B2 | 9/2011 | Rappaport et al. |
| 8,044,845 | B2 | 10/2011 | Saunders |
| 8,049,663 | B2 | 11/2011 | Frank et al. |
| 8,059,026 | B1 | 11/2011 | Nunez |
| 8,102,306 | B2 | 1/2012 | Smith, Jr. et al. |
| 8,115,672 | B2 | 2/2012 | Nouvel et al. |
| 8,154,436 | B2 | 4/2012 | Szajnowski |
| 8,169,359 | B2 | 5/2012 | Aoyagi |
| 8,212,713 | B2 | 7/2012 | Aiga et al. |
| 8,330,650 | B2 | 12/2012 | Goldman |
| 8,390,507 | B2 | 3/2013 | Wintermantel |
| 8,471,760 | B2 | 6/2013 | Szajnowski |
| 8,532,159 | B2 | 9/2013 | Kagawa et al. |
| 8,547,988 | B2 | 10/2013 | Hadani et al. |
| 8,686,894 | B2 | 4/2014 | Fukuda et al. |
| 8,694,306 | B1 | 4/2014 | Short et al. |
| 8,994,581 | B1 | 3/2015 | Brown |
| 9,020,011 | B1 | 4/2015 | Hiebert et al. |
| 9,121,943 | B2 | 9/2015 | Stirlin-Gallacher et al. |
| 9,182,479 | B2 | 11/2015 | Chen et al. |
| 9,239,378 | B2 | 1/2016 | Kishigami et al. |
| 9,239,379 | B2 | 1/2016 | Burgio et al. |
| 9,274,217 | B2 | 3/2016 | Change et al. |
| 9,282,945 | B2 | 3/2016 | Smith et al. |
| 9,335,402 | B2 | 5/2016 | Maeno et al. |
| 9,400,328 | B2 | 7/2016 | Hsiao et al. |
| 9,541,639 | B2 | 1/2017 | Searcy et al. |
| 9,568,600 | B2 | 2/2017 | Alland |
| 9,575,160 | B1 | 2/2017 | Davis et al. |
| 9,599,702 | B1 | 3/2017 | Bordes et al. |
| 9,689,967 | B1 | 6/2017 | Stark et al. |
| 9,709,674 | B2 | 7/2017 | Moriuchi et al. |
| 9,720,073 | B1 | 8/2017 | Davis et al. |
| 9,720,080 | B1 | 8/2017 | Rodenbeck |
| 9,753,121 | B1 | 9/2017 | Davis |
| 9,753,132 | B1 | 9/2017 | Bordes et al. |
| 9,772,397 | B1 | 9/2017 | Bordes et al. |

(56) References Cited

U.S. PATENT DOCUMENTS

| | | | |
|---|---|---|---|
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 9,945,935 B2 | 4/2018 | Eshraghi et al. |
| 9,954,955 B2 | 4/2018 | Davis et al. |
| 9,971,020 B1 | 5/2018 | Maher et al. |
| 9,989,627 B2 | 6/2018 | Eshraghi et al. |
| 9,989,638 B2 | 6/2018 | Harris et al. |
| 10,073,171 B2 | 9/2018 | Bordes et al. |
| 10,090,585 B2 | 10/2018 | Dinc et al. |
| 10,092,192 B2 | 10/2018 | Lashkari et al. |
| 10,142,133 B2 | 11/2018 | Bordes et al. |
| 10,145,954 B2 | 12/2018 | Davis et al. |
| 10,191,142 B2 | 1/2019 | Eshraghi et al. |
| 10,197,671 B2 | 2/2019 | Alland et al. |
| 10,215,853 B2 | 2/2019 | Stark et al. |
| 10,261,179 B2 | 4/2019 | Davis et al. |
| 10,305,611 B1 | 5/2019 | Rimini et al. |
| 10,324,165 B2 | 6/2019 | Bordes et al. |
| 10,386,470 B2 | 8/2019 | Zivkovic |
| 10,536,529 B2 | 1/2020 | Davis et al. |
| 10,551,482 B2 | 2/2020 | Eshraghi et al. |
| 10,573,959 B2 | 2/2020 | Alland et al. |
| 10,594,916 B2 | 3/2020 | Sivan |
| 10,605,894 B2 | 3/2020 | Davis et al. |
| 10,670,695 B2 | 6/2020 | Maher et al. |
| 10,690,780 B1 | 6/2020 | Zarubica et al. |
| 10,775,478 B2 | 9/2020 | Davis et al. |
| 10,775,493 B2 * | 9/2020 | Santra .................. G01S 13/904 |
| 10,805,933 B2 | 10/2020 | Stephens et al. |
| 10,812,985 B2 | 10/2020 | Mody et al. |
| 10,852,408 B2 | 12/2020 | Aslett et al. |
| 10,866,306 B2 | 12/2020 | Maher et al. |
| 10,908,272 B2 | 2/2021 | Rao et al. |
| 10,935,633 B2 | 3/2021 | Maher et al. |
| 10,976,431 B2 | 4/2021 | Harris et al. |
| 11,054,516 B2 | 7/2021 | Wu et al. |
| 11,086,010 B2 | 8/2021 | Davis et al. |
| 11,105,890 B2 | 8/2021 | Behrens et al. |
| 11,175,377 B2 | 11/2021 | Bordes et al. |
| 11,194,016 B2 | 12/2021 | Eshraghi et al. |
| 11,262,448 B2 | 3/2022 | Davis et al. |
| 11,271,328 B2 | 3/2022 | Liu et al. |
| 11,340,331 B2 | 5/2022 | Maher et al. |
| 11,454,697 B2 | 9/2022 | Maher et al. |
| 11,474,225 B2 | 10/2022 | Dent et al. |
| 12,320,920 B2 * | 6/2025 | Wu .......................... G01S 7/356 |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0063653 A1 | 5/2002 | Oey et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0164791 A1 | 9/2003 | Shinoda et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0070532 A1 | 4/2004 | Ishii et al. |
| 2004/0107030 A1 | 6/2004 | Nishira et al. |
| 2004/0130486 A1 | 7/2004 | Akopian |
| 2004/0138802 A1 | 7/2004 | Kuragaki et al. |
| 2004/0215373 A1 | 10/2004 | Won et al. |
| 2004/0229590 A1 | 11/2004 | Kubo et al. |
| 2005/0001757 A1 | 1/2005 | Shinoda et al. |
| 2005/0008065 A1 | 1/2005 | Schilling |
| 2005/0069162 A1 | 3/2005 | Haykin |
| 2005/0090274 A1 | 4/2005 | Miyashita |
| 2005/0100106 A1 | 5/2005 | Chen |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0220943 A1 | 10/2006 | Schlick et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0040729 A1 | 2/2007 | Ohnishi |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0205937 A1 | 9/2007 | Thompson |
| 2007/0263748 A1 | 11/2007 | Mesecher |
| 2007/0279303 A1 | 12/2007 | Schoebel |
| 2008/0080599 A1 | 4/2008 | Kange et al. |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0232510 A1 | 9/2009 | Gupta et al. |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0039313 A1 | 2/2010 | Morris |
| 2010/0075704 A1 | 3/2010 | McHenry et al. |
| 2010/0116365 A1 | 5/2010 | McCarty |
| 2010/0127916 A1 | 5/2010 | Sakai et al. |

(56) References Cited

U.S. PATENT DOCUMENTS

| | | |
|---|---|---|
| 2010/0156690 A1 | 6/2010 | Kim et al. |
| 2010/0166121 A1 | 7/2010 | Kenney, Jr. |
| 2010/0198513 A1 | 8/2010 | Zeng et al. |
| 2010/0202495 A1 | 8/2010 | Kagawa et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0234448 A1 | 9/2011 | Hayase |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050092 A1 | 3/2012 | Lee et al. |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0146834 A1 | 6/2012 | Karr |
| 2012/0173246 A1 | 7/2012 | Choi et al. |
| 2012/0194377 A1 | 8/2012 | Yukmatsu et al. |
| 2012/0195349 A1 | 8/2012 | Lakkis |
| 2012/0235857 A1 | 9/2012 | Kim et al. |
| 2012/0249356 A1 | 10/2012 | Shope |
| 2012/0257643 A1 | 10/2012 | Wu et al. |
| 2012/0283987 A1 | 11/2012 | Busking et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0129253 A1 | 5/2013 | Moate et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0049423 A1 | 2/2014 | De Jong et al. |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0168004 A1 | 6/2014 | Chen et al. |
| 2014/0218240 A1 | 8/2014 | Kpodzo et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2014/0350815 A1 | 11/2014 | Kambe |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0153445 A1 | 6/2015 | Jansen |
| 2015/0160335 A1 | 6/2015 | Lynch et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226838 A1 | 8/2015 | Hayakawa |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0280893 A1 | 10/2015 | Choi et al. |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0333847 A1 | 11/2015 | Bharadia et al. |
| 2015/0346323 A1 | 12/2015 | Kollmer |
| 2015/0369912 A1 | 12/2015 | Kishigami et al. |
| 2015/0373167 A1 | 12/2015 | Murashov et al. |
| 2016/0003935 A1 | 1/2016 | Stainvas Olshansky et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0025844 A1 | 1/2016 | Mckitterick et al. |
| 2016/0033623 A1 | 2/2016 | Holder |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131742 A1 | 5/2016 | Schoor |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0157828 A1 | 6/2016 | Sumi et al. |
| 2016/0178732 A1 | 6/2016 | Oka et al. |
| 2016/0213258 A1 | 7/2016 | Lashkari et al. |
| 2016/0223643 A1 | 8/2016 | Li et al. |
| 2016/0223644 A1 | 8/2016 | Soga |
| 2016/0238694 A1 | 8/2016 | Kishigami |
| 2016/0245909 A1 | 8/2016 | Aslett et al. |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0090015 A1 | 3/2017 | Breen et al. |
| 2017/0117946 A1 | 4/2017 | Lee et al. |
| 2017/0117950 A1 | 4/2017 | Strong |
| 2017/0153316 A1 | 6/2017 | Wintermantel |
| 2017/0176583 A1 | 6/2017 | Gulden et al. |
| 2017/0212213 A1 | 7/2017 | Kishigami |
| 2017/0219689 A1 | 8/2017 | Hung et al. |
| 2017/0223712 A1 | 8/2017 | Stephens et al. |
| 2017/0234968 A1 | 8/2017 | Roger et al. |
| 2017/0254879 A1 | 9/2017 | Tokieda, I et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |
| 2017/0363731 A1 | 12/2017 | Bordes et al. |

(56) References Cited

U.S. PATENT DOCUMENTS

| | | |
|---|---|---|
| 2018/0003799 A1 | 1/2018 | Yang et al. |
| 2018/0019755 A1 | 1/2018 | Josefsberg et al. |
| 2018/0095161 A1 | 4/2018 | Kellum et al. |
| 2018/0095163 A1 | 4/2018 | Lovberg et al. |
| 2018/0113191 A1 | 4/2018 | Villeval et al. |
| 2018/0115371 A1 | 4/2018 | Trotta et al. |
| 2018/0128913 A1 | 5/2018 | Bialer |
| 2018/0149730 A1 | 5/2018 | Li et al. |
| 2018/0149736 A1 | 5/2018 | Alland et al. |
| 2018/0175907 A1 | 6/2018 | Marr |
| 2018/0231655 A1 | 8/2018 | Stark et al. |
| 2018/0252809 A1 | 9/2018 | Davis et al. |
| 2018/0259620 A1 | 9/2018 | Maher et al. |
| 2018/0271776 A1 | 9/2018 | Kazakevitch et al. |
| 2018/0294564 A1 | 10/2018 | Kim |
| 2018/0294908 A1 | 10/2018 | Abdelmonem |
| 2018/0358706 A1 | 12/2018 | Kildal et al. |
| 2018/0374346 A1 | 12/2018 | Fowe |
| 2019/0013566 A1 | 1/2019 | Merrell |
| 2019/0056476 A1 | 2/2019 | Lin |
| 2019/0064364 A1 | 2/2019 | Boysel et al. |
| 2019/0072641 A1 | 3/2019 | Al-Stouhi et al. |
| 2019/0146059 A1 | 5/2019 | Zanati et al. |
| 2019/0178983 A1 | 6/2019 | Lin et al. |
| 2019/0187245 A1 | 6/2019 | Guarin Aristizabal et al. |
| 2019/0219685 A1 | 7/2019 | Shan |
| 2019/0235050 A1 | 8/2019 | Maligeorgos et al. |
| 2019/0271776 A1 | 9/2019 | Davis et al. |
| 2019/0324134 A1 | 10/2019 | Cattle |
| 2019/0379386 A1 | 12/2019 | Chi |
| 2019/0383929 A1 | 12/2019 | Melzer et al. |
| 2020/0003884 A1 | 1/2020 | Arkind et al. |
| 2020/0011983 A1 | 1/2020 | Kageme et al. |
| 2020/0014105 A1 | 1/2020 | Braun et al. |
| 2020/0033445 A1 | 1/2020 | Raphaeli et al. |
| 2020/0036487 A1 | 1/2020 | Hammond et al. |
| 2020/0064455 A1 | 2/2020 | Schroder et al. |
| 2020/0107249 A1 | 4/2020 | Stauffer et al. |
| 2020/0142049 A1 | 5/2020 | Solodky et al. |
| 2020/0153907 A1 | 5/2020 | Davis et al. |
| 2020/0158861 A1 | 5/2020 | Cattle et al. |
| 2020/0191939 A1 | 6/2020 | Wu et al. |
| 2020/0292665 A1 | 9/2020 | Maher et al. |
| 2020/0292666 A1 | 9/2020 | Maher et al. |
| 2020/0313719 A1 | 10/2020 | Blanchard et al. |
| 2020/0363499 A1 | 11/2020 | Mayer et al. |
| 2020/0393536 A1 | 12/2020 | Stettiner |
| 2021/0003664 A1 | 1/2021 | Davis et al. |
| 2021/0156979 A1 | 5/2021 | Rao et al. |
| 2021/0181301 A1 | 6/2021 | Maher et al. |
| 2021/0190904 A1 | 6/2021 | Bourdoux et al. |
| 2021/0364634 A1 | 11/2021 | Davis et al. |
| 2021/0389414 A1 | 12/2021 | Behrens et al. |
| 2022/0291335 A1 | 9/2022 | Maher et al. |
| 2022/0350020 A1 | 11/2022 | Davis et al. |

FOREIGN PATENT DOCUMENTS

| | | |
|---|---|---|
| EP | 0725480 | 11/2011 |
| EP | 2374217 | 4/2013 |
| EP | 2884299 | 6/2015 |
| EP | 2821808 | 7/2015 |
| EP | 3349038 | 7/2018 |
| EP | 3062446 | 9/2018 |
| EP | 3152956 | 3/2019 |
| EP | 3483622 | 5/2019 |
| FR | 2751086 | 1/1998 |
| GB | 2529029 | 2/2016 |
| JP | 3625307 | 12/2004 |
| JP | 2010243330 | 10/2010 |
| KR | 101010522 | 1/2011 |
| KR | 102088426 | 12/2020 |
| WO | WO2008022981 | 2/2008 |
| WO | WO2010/022156 | 2/2010 |
| WO | WO2013147948 | 10/2013 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017187242 | 2/2017 |
| WO | WO2017059961 | 4/2017 |
| WO | WO2017175190 | 10/2017 |
| WO | WO2017187330 | 11/2017 |
| WO | WO2020/259916 | 12/2020 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 Ghz-BW CW Radar Transmitter in 28 nm CMOS," in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.

Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.

A. Bourdoux, U. Ahamd, D. Guermandi, S. Brebels, A. Dewilde, W. Van Thillo, PMCW "Waveform and MIMO Technique for a 79 GHz CMOS Automotive Radar", 2016 IEEE Radar Conference (RadarConf), 2016, pp. 1-5, doi: 10.1109/RADAR.2016.7485114. (Year: 2016).

V. Jain, F. Tzeng, L. Zhou and P. Heydari, "A single-Chip Dual-Band 22-29-GHz/77-81-GHz BiCMOS Transceiver for Automotive Radars," in IEEE Journal of Solid-State Circuits, vol. 44, No. 12, pp. 3469-3485, Dec. 2009, doi: 10.1109/JSSC.2009.2032583. (Year: 2009).

A. Medra et al., "An 80 GHz Low-Noise Amplifier Resilient to the TX Spillover in Phase-Modulated Continuous-Wave Radars," In IEEE Journal of Solid-State Circuits, vol. 51, No. 5, pp. 1141-1153, May 2016, doi: 10.1109/JSSC.2016.2520962. (Year: 2016).

B. P. Ginsburg et al., "A multimode 76-to-81Ghz automotive radar transceiver with autonomous monitoring," 2018 IEEE International Solid—State Circuits Conference—(ISSCC), 2018, pp. 158-160, doi: 10.1109/ISSCC.2018.8310232 (Year: 2018).

Y. Ma, C. Miao, Y. Zhao, and W. Wu, "An MIMO Radar System Based on the Sparse-Array and Its Frequency Migration Calibration Method" , in MDPI Journal of Sensors, vol. 19, issue No. 16, Published Aug. 2019, doi: 10.3390/s19163580 (Year: 2019).

Levanon, N., "Stepped-frequency pulse-train radar signal", IEE Proc. on Radar Sonar Navigation, vol. 149, No. 6, Dec. 2002.

Liao, Z., Lu, D., Hu, J., Zhang, J., "A Novel Range Profile Synthesis Method for Random Hopping Frequency Radar", IEEE International Conference on Digital Signal Processing, Oct. 2016.

Zeng, T., Chang, S., Fan, H., Liu, Q., "Design and Processing of a Novel Chaos-Based Stepped Frequency Synthesized Wideband Radar Signal", Sensors, Mar. 2018.

Pieraccini, M., Miccinesi, L., Rojhani, N., "A Doppler Range Compensation for Step-Frequency Continuous-Wave Radar for Detecting Small UAV", Sensors, Mar. 2019.

Perry, R.P., DiPietro, R.C., Fante, R.L., "Coherent Integration with Range Migration Using Keystone Formatting", IEEE Radar Conference, Apr. 2007.

* cited by examiner pulses, or PRI index offset due to doppler re-modulation before correlators

1001

1003

1002 conventional FFT output block edge member center member of doppler group edge member a slice of dopplers in a group range walk transform block

PRI$_1$     PRI$_2$                               PRI$_N$

Range Walk
cross-over time

Scan or dwell time for coherent integration in
pulse-doppler processing consisting of N cross-
overs

SYSTEM AND METHOD FOR RADAR RANGE WALK COMPENSATION IN RADAR SYSTEMS

CROSS REFERENCE TO RELATED APPLICATION

The present application claims the filing benefits of U.S. provisional application, Ser. No. 63/353,044, filed Jun. 17, 2022, which is hereby incorporated by reference herein in its entirety.

FIELD OF THE INVENTION

The present invention is directed to radar systems, and more particularly to radar systems for vehicles and robotics.

BACKGROUND OF THE INVENTION

The use of radar to determine direction, range, and velocity of objects in an environment is important in a number of applications including automotive radar, robotic sensing, and positioning. In practice, radars experience system impairments that degrade their performance.

A radar system consists of transmitters and receivers. The transmitters generate a baseband signal which is upconverted to a radio frequency (RF) signal that propagates according to an antenna pattern. The transmitted signal is reflected off of object or targets in the environment. The received signal at each receiver is the totality of the reflected signal from all targets in the environment. The receiver down converts the received signal to baseband and compares the baseband received signal to the baseband signal at one or more transmitters. This is used to determine the range, velocity, and angle of targets in the environment.

Modern pulse radars achieve coherent integration by performing a Fast Fourier Transform (FFT) along the pulse repetition interval (PRI) time dimension. This FFT exploits the Doppler Effect introduced by moving targets along the line-of-sight of the radar. However, the conventional doppler FFT approach simplifies actual physics of the moving targets. With actual physics of motion, in addition to Doppler rotation caused by radio frequency (RF) wave compression or expansion, the range of the moving target is also changing. This latter part of the actual physics is called target range walk, or range migration.

SUMMARY OF THE INVENTION

Embodiments of the present invention provide for a radar system and associated methods that includes a technique for improving the coherent integration gain of the radar system when the target velocity is sufficiently high such that range bin migration occurs during the radar scan. By applying a prediction of the range bin migration ("range walking") for each target Doppler, the losses of signal power as result of the range bin migration are then compensated for. An exemplary radar system uses a range walk compensation algorithm to reduce system losses resulting from moving targets. During the coherent integration of pulse radar systems, the conventional Fast Fourier Transform (FFT) for Doppler processing needs to change the input range bin number in accordance to the velocity of the target. The algorithm allows for configuration of Doppler groups to compute several Dopplers with one FFT. Each Doppler group has a transform Doppler that is close to the center of the group which will dictate the change of range bins for the input data to the FFT. As the range bins are changed, there are two input filter techniques: nearest bin select, and 2-tap filter. After range walk compensation processes all Doppler groups by FFT, the resultant output block has much higher coherent integration as compared to just a conventional FFT.

In an aspect of the present invention, the radar system includes the creation of Doppler groups where only the one Doppler frequency in that group, usually the middle one, is used as the prediction for range walking. By creating Doppler groups, the total complexity of Doppler processing with range walk compensation is reduced in accordance with the number of Doppler groups to create.

In another aspect of the present invention, a parameter labeled FWF is used to divide up the entire Doppler coverage into Doppler groups.

In yet another aspect of the present invention, the application of a range bin filter is used to combine one or more range bins into the Doppler processing. The range bin filter can be a nearest bin select method that uses just one range bin per sample of the Doppler processing vector. A 2-tap filter that combines two range bins to form one sample into the Doppler processing vector is another option. The 2-tap filter uses coefficients that are dependent on the radar modulation.

DESCRIPTION OF THE PREFERRED EMBODIMENTS

The present invention will now be described with reference to the accompanying Figures, wherein numbered elements in the following written description correspond to like-numbered elements in the Figures. All figures don't draw time, frequency, or magnitudes to scale. Accurate interpretation of scale must be derived from the equations given in this invention. As discussed herein, the exemplary radar system includes techniques and processes for improving a coherent integration gain of the radar system. As described herein, the radar system uses a range walk compensation process or algorithm to reduce system losses resulting from moving targets. During the coherent integration of pulse radar systems, the conventional Fast Fourier Transform (FFT) for Doppler processing needs to change the input range bin number in accordance to the velocity of the target. The process allows for configuration of Doppler groups to compute several Dopplers with one FFT. Each Doppler group has a transform Doppler that is close to the center of the group which will dictate the change of range bins for the input data to the FFT. As the range bins are changed, there are two input filter techniques: nearest bin select, and 2-tap filter. After range walk compensation processes all Doppler groups by FFT, the resultant output block has much higher coherent integration as compared to just a conventional FFT.

Figure 1:
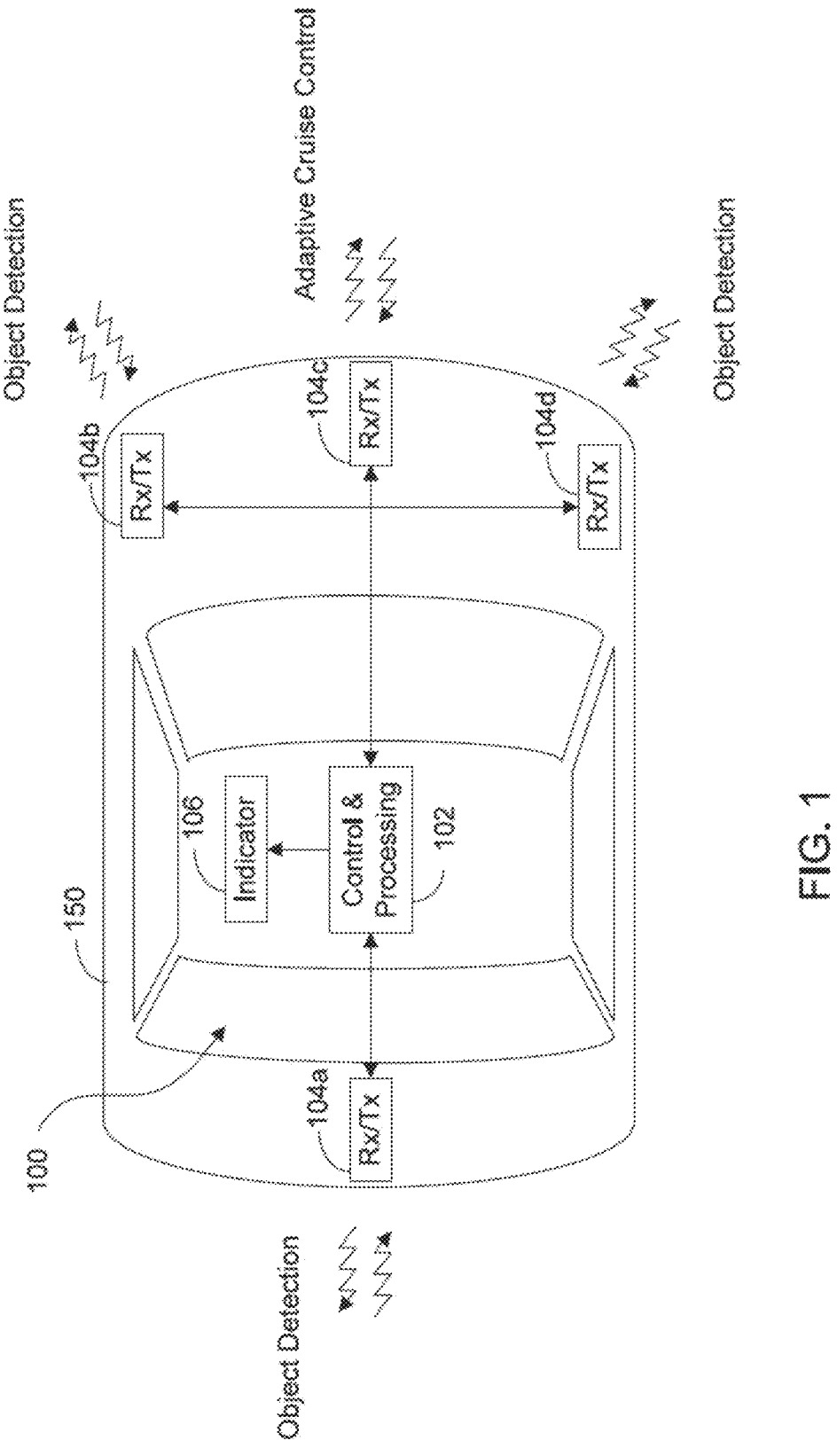
FIG. 1 is a plan view of an automobile equipped with a radar system in accordance with the present invention.

FIG. 1 illustrates an exemplary radar system 100 configured for use in a vehicle 150. The vehicle 150 may be an automobile, truck, or bus, etc. As illustrated in FIG. 1, the radar system 100 may comprise one or more transmitters and one or more virtual receivers 104a-104d. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2B:
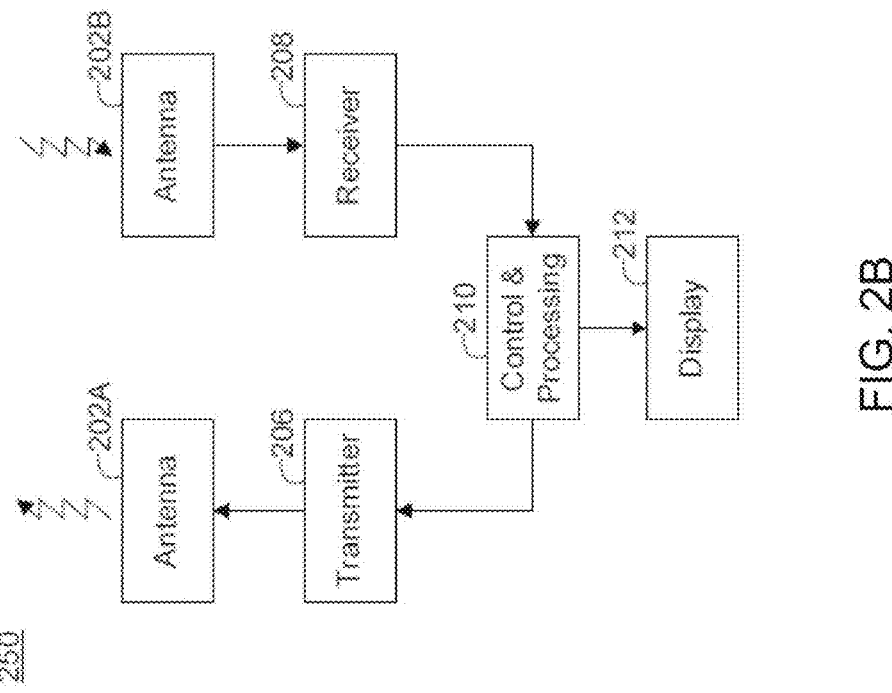
FIG. 2A and FIG. 2B are block diagrams of radar systems in accordance with the present invention.
Figure 2A:
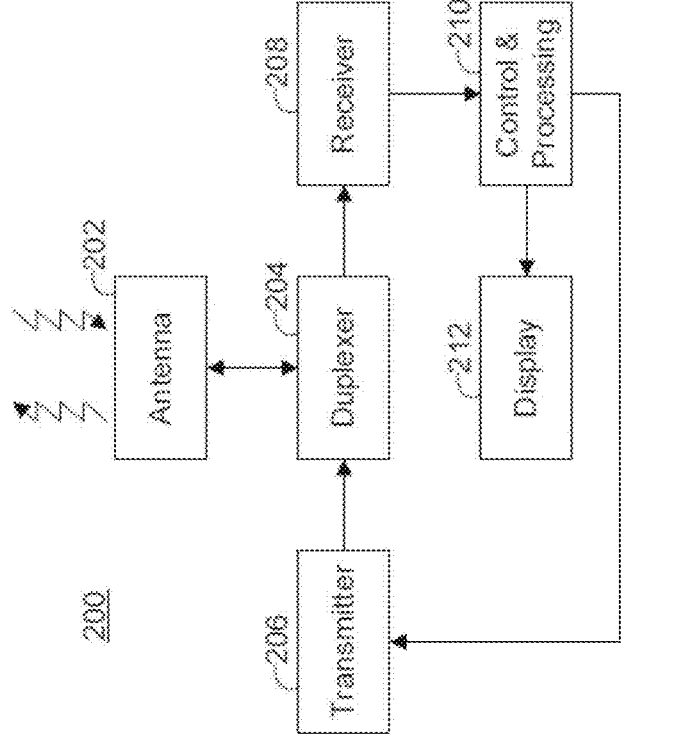
Figure 3:
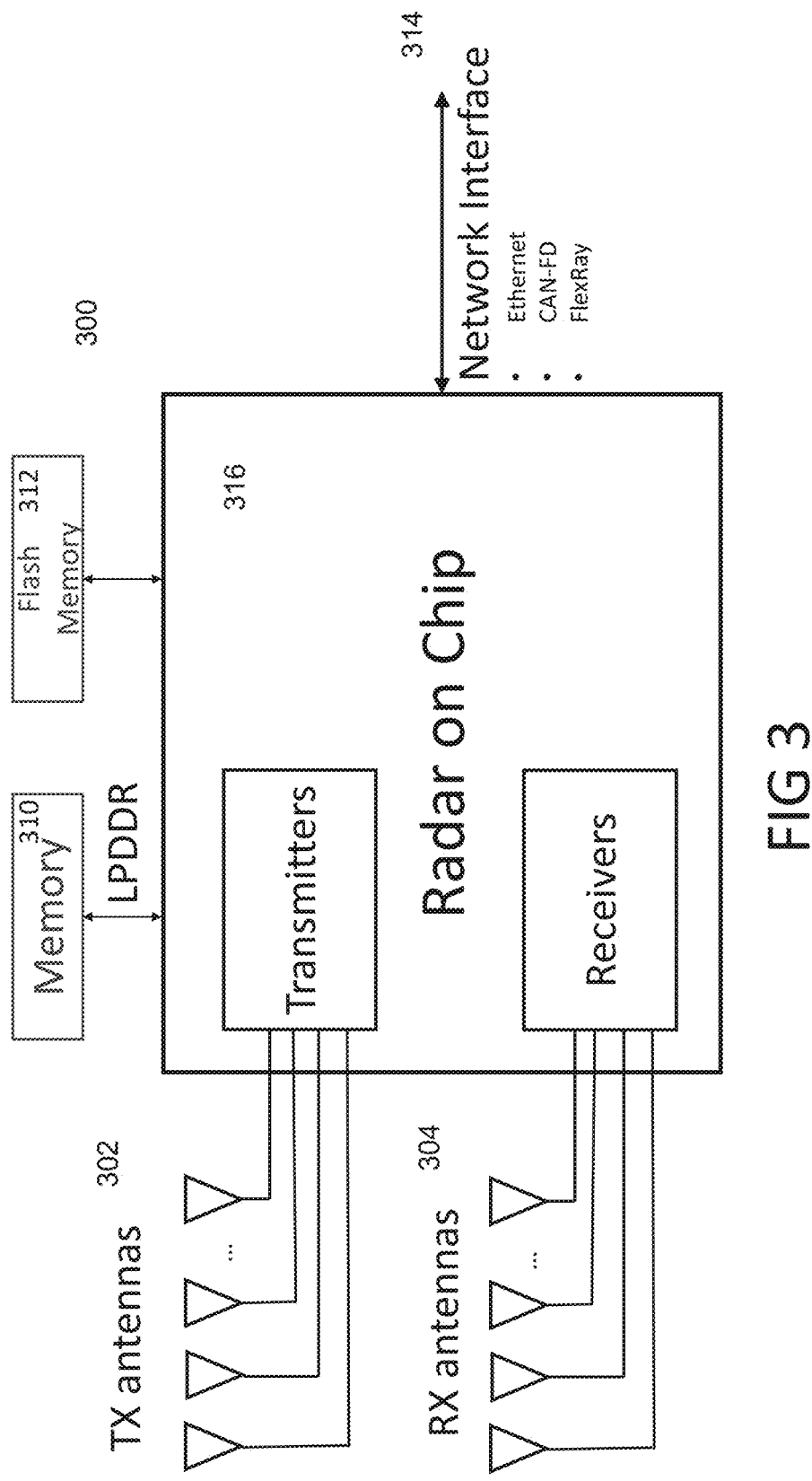
FIG. 3 is a block diagram illustrating a radar with a plurality of receivers and a plurality of transmitters (MIMO radar) in accordance with the present invention.

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. As discussed herein, the control and processing module 210 is also operable to produce a radar data output that is provided to other control units. The control and processing module 210 is also operable to control the transmitter 206. FIG. 2B illustrates an alternative exemplary radar system 250 with a pair of antennas 202a, 202b, a separate antenna 202a for the transmitter 206 and another antenna 202b for the receiver 208. While pulse radar systems may use shared or separate antennas, continuous wave radars (discussed herein) will use separate antennas (for transmitting and receiving) because of their continuous operation.

There are several types of signals used in radar systems. One type of radar signal is known as a frequency modulated continuous waveform (FMCW). In this type of system, the transmitter of the radar system sends a continuous signal in which the frequency of the signal varies across some range of frequencies. This is sometimes called a chirp radar system. At the receiver a matched filter can be used to process the received signal. The output of the matched filter is a so-called "pulse-compressed" signal with a pulse duration inversely proportional to the bandwidth used in the chirp signal. Mixing (multiplying) the reflected wave from a target with a replica of the transmitted signal results in a CW signal with a frequency that represents the distance between the radar transmitter/receiver and the target. By sweeping up in frequency and then down in frequency the Doppler frequency can also be determined.

The transmitted signal from each radar transmitter consists of a baseband signal which is upconverted to an RF signal by an RF upconverter followed by an antenna. The received signal at each radar receiver antenna is downconverted by an RF downconverter to a complex baseband signal. The baseband transmitted radio signals and the reflected radio signals after downconversion in the receiver are provided to the processor. As an example, a baseband signal used for transmission might consist of repeated sequences of random or pseudo-random binary values for one transmitter, e.g., $(-1, -1, -1, -1, 1, 1, 1, -1, 1, 1, -1, -1, 1, -1, 1)$, although any sequence, including non-binary sequences and non-periodic sequences could be used and different sequences would be used for different transmitters. The use of truly random number generators and pseudo random number generators to produce the values used to phase modulate the radio signal before transmission is described in detail in U.S. patent application Ser. No. 15/204,003, filed Jul. 7, 2016, which is hereby incorporated by reference herein in its entirety.

The exemplary radar sensing system may also utilize aspects of the radar systems described in U.S. provisional applications, Ser. No. 62/319,613, filed Apr. 7, 2016, Ser. No. 62/327,003, filed Apr. 25, 2016, Ser. No. 62/327,004, filed Apr. 25, 2016, Ser. No. 62/327,005, filed Apr. 25, 2016, Ser. No. 62/327,006, filed Apr. 25, 2016, Ser. No. 62/327, 015, filed Apr. 25, 2016, Ser. No. 62/327,016, filed Apr. 25, 2016, Ser. No. 62/327,017, filed Apr. 25, 2016, Ser. No. 62/327,018, filed Apr. 25, 2016, Ser. No. 62/332,544, filed May 6, 2016, Ser. No. 62/336,966, filed May 16, 2016, Ser. No. 62/338,792, filed May 19, 2016, Ser. No. 62/816,941, filed Mar. 12, 2019, Ser. No. 63/167,347, filed Mar. 29, 2021, Ser. No. 63/140,567, filed Jan. 22, 2021, Ser. No. 63/194,267 filed May 28, 2021, which are all hereby incorporated by reference herein in their entireties.
Radar System Range Walk Compensation:

Modern pulse radars achieve coherent integration by performing a Fast Fourier Transform (FFT) along the pulse repetition interval (PRI) time dimension. This FFT exploits the Doppler Effect introduced by moving targets along the line-of-sight of the radar. However, the conventional Doppler FFT approach simplifies actual physics of the moving targets. With actual physics of motion, in addition to Doppler rotation caused by radio frequency (RF) wave compression or expansion, the range of the moving target is also changing. This latter part of the actual physics is called target range walking, or range migration.

A conventional Keystone transformation technique requires a sophisticated processing chain in the radar receiver. That extra sophistication comes at a cost of joint processing of both range and Doppler dimensions.

Figure 4A:
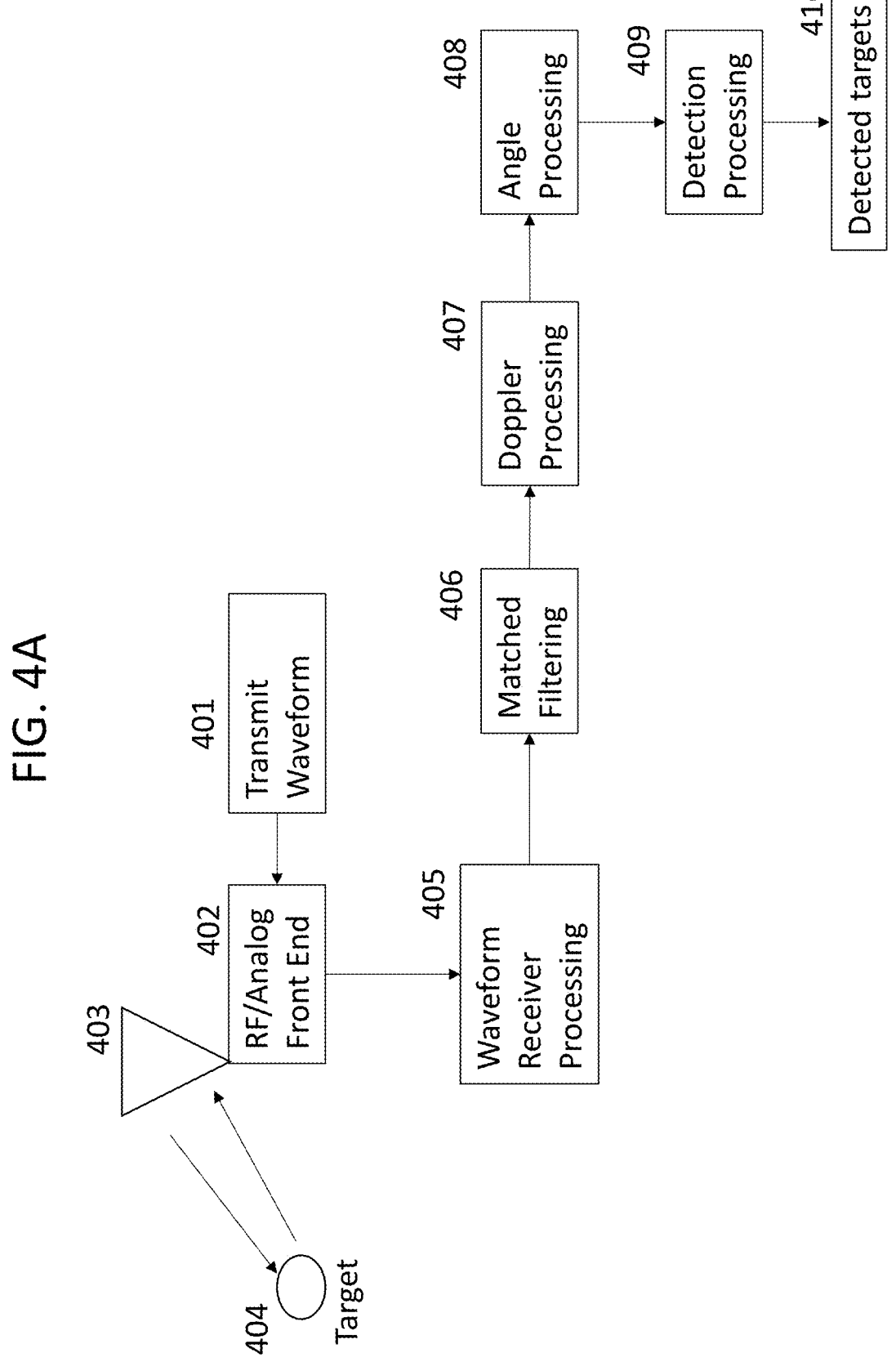
FIGS. 4A and 4B are diagrams of an exemplary radar receiver architecture for range walk compensation in accordance with the present invention.

FIG. 4A illustrates an exemplary radar processing system. An exemplary transmit waveform 401 is generated for transmission via an RF/analog front end 402. The RF front end 402 includes the analog components needed to transmit the radar waveform at the radio frequency (RF) designed for radar. The RF front end 402 also forms an analog receiving path to process the radar reflections coming back from a target. An antenna array 403 is attached to the RF front end 402. The antenna array 403 interfaces the RF transmissions to the air (transmits the radio signals). The RF transmissions illuminate a target 404 that reflects some of the radar transmissions back to the radar system. The received radar reflection (at the antenna array 403) is routed by the RF front end 402 into a waveform receiver 405.

The waveform receiver 405 is configured to provide the waveform processing needed to convert down-converted signals into the original modulation as closely as possible. Following the waveform receiver 405 is a filter 406 providing matched filtering of the modulation. A Doppler processing module 407, is next, followed by an angle processing module 408 that exploits antenna array geometries. Lastly a detection module 409 is configured to perform target detection by estimating the noise floor and signals above that noise. At the output of the entire receiver processing chain is a list of detected targets 410, which can be used by radar applications.

Figure 4B:
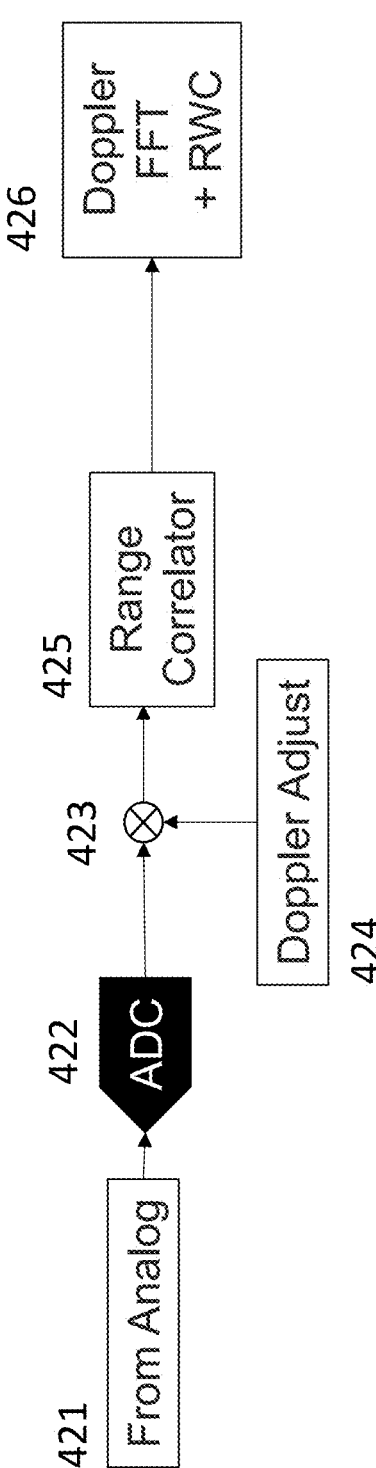

FIG. 4B is a diagram of an exemplary radar receiver architecture for Range Walk Compensation (RWC) as an enhancement to the Doppler processing shown earlier. This architecture inserts a rotation process realized by mixer 423 and Doppler adjust 424, immediately following the ADC 422. The mixer 423 and Doppler adjust 424 can be configured with a known frequency, that's translated from the velocity of the radar, per duration of a radar scan. This pre-RWC frequency rotation is usually set to the Ego velocity of the radar and provided to the RWC block 426 such that the RWC block 426 can adjust all other Dopplers relative to this one.

When a radar implements multi-antennas, an exemplary range correlator 425 processes virtual receiver (VRX) outputs into the Doppler FFT & RWC 426. Each VRX corresponds a respective one of each transmitter and receiver of the multi-antenna system. Hence, the Doppler FFT & RWC 426 repeats its processing for each VRX in the system.

Figure 5:
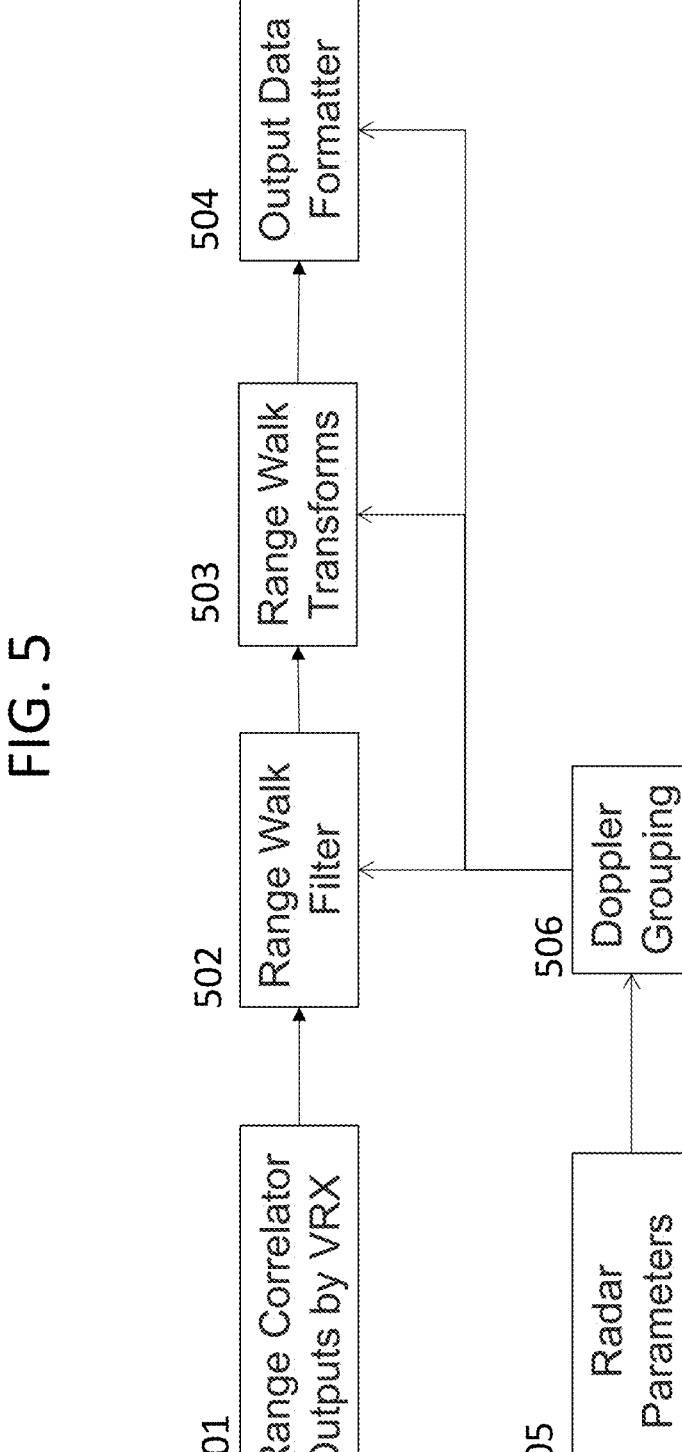
FIG. 5 is a diagram of an exemplary high level algorithm flow for range walk compensation with a configuration process in accordance with the present invention.

FIG. 5 illustrates additional details from the architecture of FIG. 4. A radar parameters block 505 retrieves all radar configurations related to RWC (range walk compensation). Some parameters belong to the part of the algorithm that processes Doppler groups which then has to be translated by a Doppler grouping block 506 such that data processing blocks from the range walk filter 502 to the range walk transforms 403 to the output data formatter 504 can operate correctly.

The range walk filter 502 has two configurations: a nearest bin, or a 2-tap filter. These parts of the exemplary embodiment will be explained later with respect to FIG. 8

The range walk transforms block 503 uses a conventional FFT engine as its core computational capability, except that the FFT engine is executed multiple times, and as many times as there are Doppler groups. This will also be elaborated further later on.

After the RWC FFT block 426 (see FIG. 4B), the output data formatter 504 formats the output frames into correct doppler bins such that the final output corresponds to a complete transform block. The entire block is complete when every doppler group has been processed.

Figure 6:
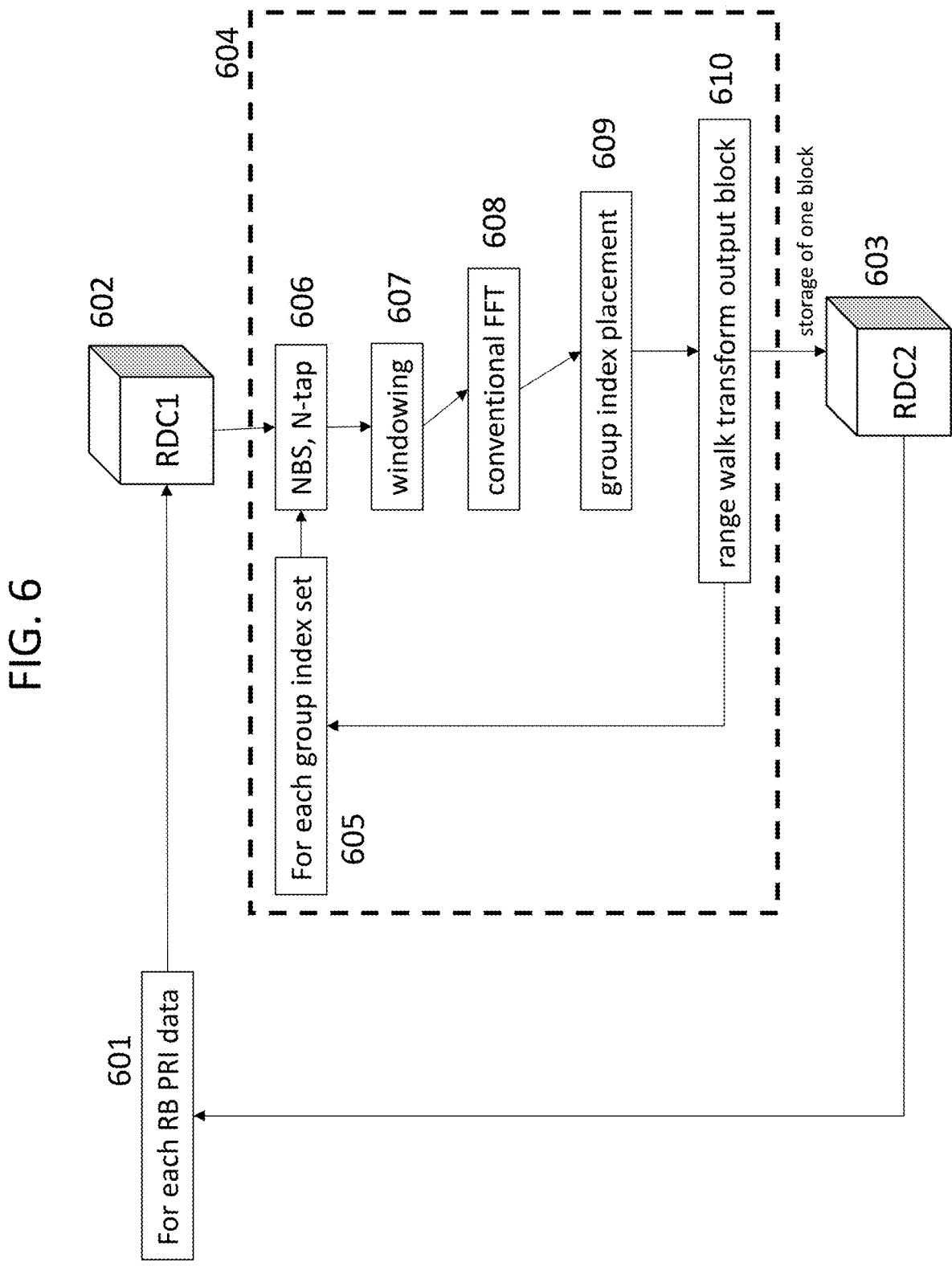
FIG. 6 is a diagram of a detailed data path flow of an exemplary range walk compensation in accordance with the present invention.

FIG. 6 illustrates an exemplary embodiment of the RWC algorithm's major processing steps. An exemplary loop control 601 steps through every range bin (RB) and processes its corresponding range walk transformation. An exemplary radar data cube (RDC) 602 includes arrays of data that have samples in the range bin, PRI, and VRX dimensions. This data, called RDC1, is fed into the RWC algorithm block 604. Block 605 is the output RDC2 data that have transformed the PRI time array samples from RDC1 602 to the Doppler frequency domain. The RDC2 603 contains the samples in the range bin, Doppler bin, and VRX dimensions.

Inside section 604, the FFT transforms are looped by control block 605 for all Doppler groups created previously by the setup process, for each RB processed. A first data processing block 606 filters the input data by either a nearest bin select or an N-tap filter. Next is a windowing block 607 which applies a conventional windowing technique of choice before FFT, which is performed on that data by a conventional FTT block 608. The FFT output is placed by an exemplary group index placement block 609 into the corresponding frequency bins based on the Doppler grouping setup. Finally, a range walk transform output block 610 is a data collection process that buffers each group of FFT output data until all groups are finished. After all the Dopplers are processed, the range walk transform output block 610 writes out the one RWC output frame of transformed data to RDC2 data set (603).

Figure 7A:
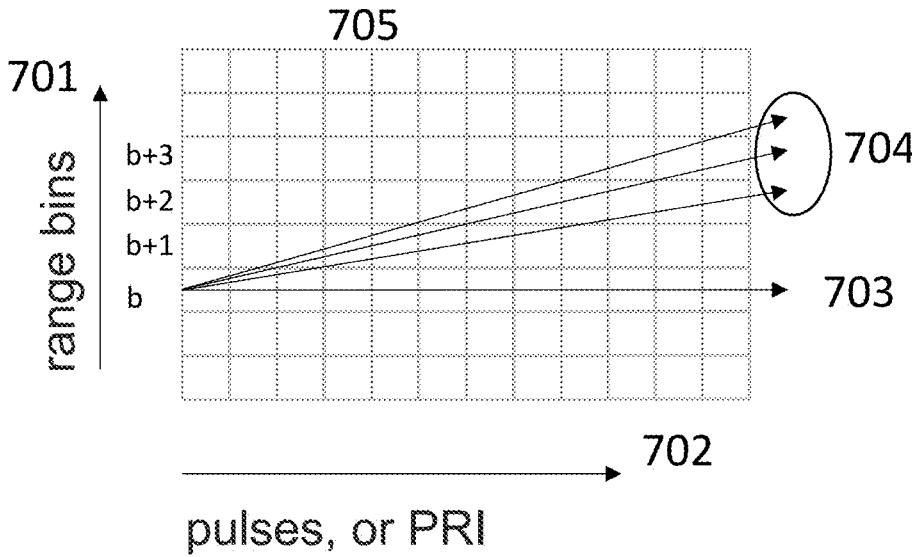
FIG. 7A is an illustration of an exemplary forming of Doppler groups for an exemplary range walk compensation in accordance with the present invention.

FIG. 7A illustrates an exemplary grouping of pulses for RWC FFT. Data from the correlator output is arranged into an array 705, per VRX. Along the vertical axis of this array 705 are range bin samples 701 with each row being labeled like b, b+1, b+2, and so on. The horizontal axis 702 of the array 705 are samples from pulses in each PRI. Conventional coherent integration along the PRI would need just one FFT per range bin, such as across the samples along the line labeled by 703.

But for targets that are moving sufficiently fast, such that their ranges are changing, the actual coherent integration would be reading samples along the diagonal lines labeled by 704. The lines 704 are a group of diagonal lines, each one representing a different Doppler frequency, or velocity, of target(s).

When the target is moving sufficiently fast such that its range is changing, the target's range bin location may increase with increasing PRI count. Then the actual Doppler transform would be reading samples along the diagonal lines 704. Each one of the diagonal lines 704 represents a different Doppler frequency, or velocity, of target(s). The center line in group 704 may be used as a close approximation to other lines.

These diagonal lines 704 along each Doppler with range walking are used to create Doppler groups for RWC. It's possible to assign one Doppler group per line for every Doppler from the collection of PRI's. In one exemplary embodiment, a selected quantity of Doppler lines are grouped to form one group and a center line of the group is selected as the FFT transformation line.

Figure 7B:
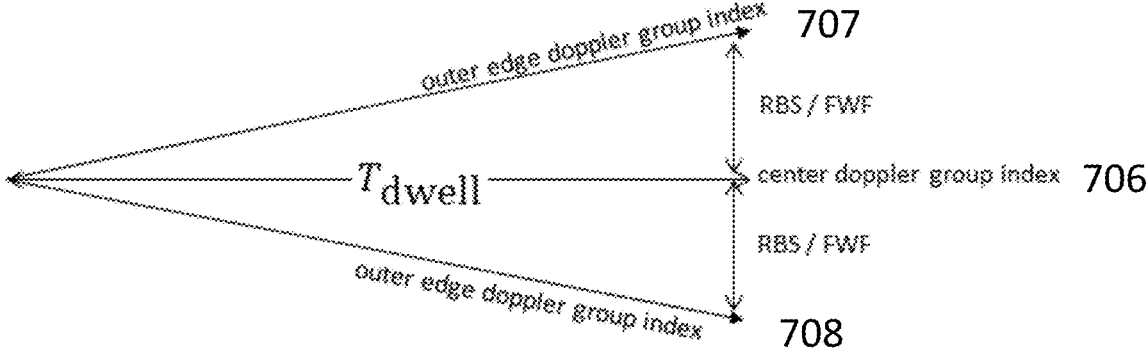
FIG. 7B is an illustration of an exemplary forming of Doppler groups using an exemplary FWF parameter in accordance with the present invention.

FIG. 7B illustrates an exemplary Doppler group that has been parameterized in relation to the configuration of the radar system. Specifically, the Doppler group is determined by the dwell time, the range bin size (RBS), and a unit-less parameter FWF, Fractional Walk Factor. FWF is configurable per dwell by the Radar Parameters (505). Given a chosen center Doppler line 701, the Doppler group is created by identifying the edge lines of that group. The upper edge 707 is bounded by positive velocity such that the distanced walked by the corresponding target over the dwell time is not more than RBS/FWF, and increases from the range bin at the start of the dwell.

Similarly for the lower boundary of the group 708, the negative Doppler serves the lower boundary for the group where the range bin doesn't decrease at the end of the dwell by more than RBS/FWF from the range bin at the start of the dwell.

Figure 8:
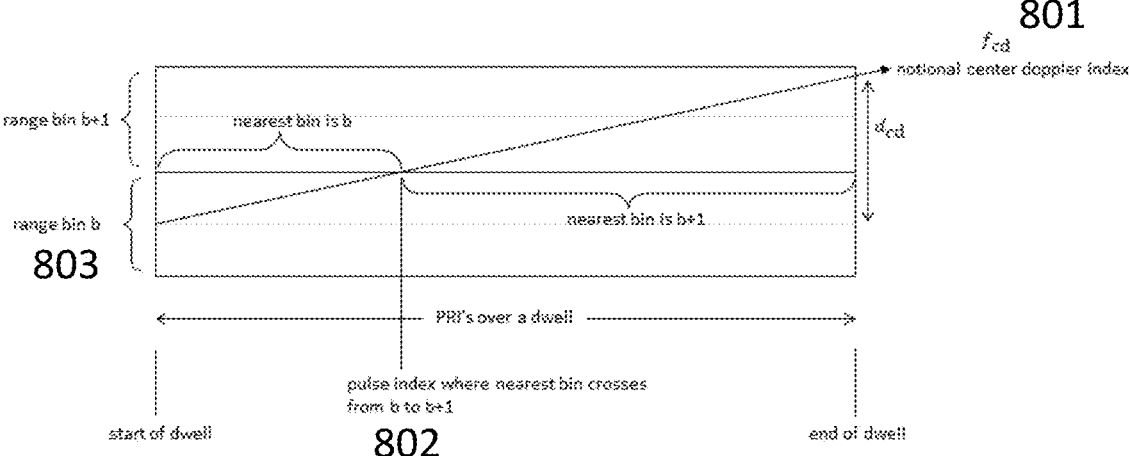
FIG. 8 is an illustration of exemplary timing controls for range walk compensation in accordance with the present invention.

FIG. 8 illustrates an exemplary implementation of the nearest bin select (NBS) method to read from the PRI samples. An exemplary location to read the samples follows the center line 801 of that group. With the start of that line in the middle of range bin b 803, after some number of PRI the line would cross into the range bin b+1. Before that crossing, the transformation input samples are read from range bin b (803). At the crossing point 802, the nearest bin select would direct the sample reading from range bin b+1. This strategy of reading from incrementing range bins continues for every cross over point for the entire dwell time.

To compute the PRI number where the crossing point occurs, calculate the velocity of the doppler line of interest. Suppose that Doppler line 801 has a corresponding frequency of $f_{cd}$, then its corresponding velocity is:

$$v_{cd} = \frac{f_{cd}\lambda}{2}$$

Figure 12:
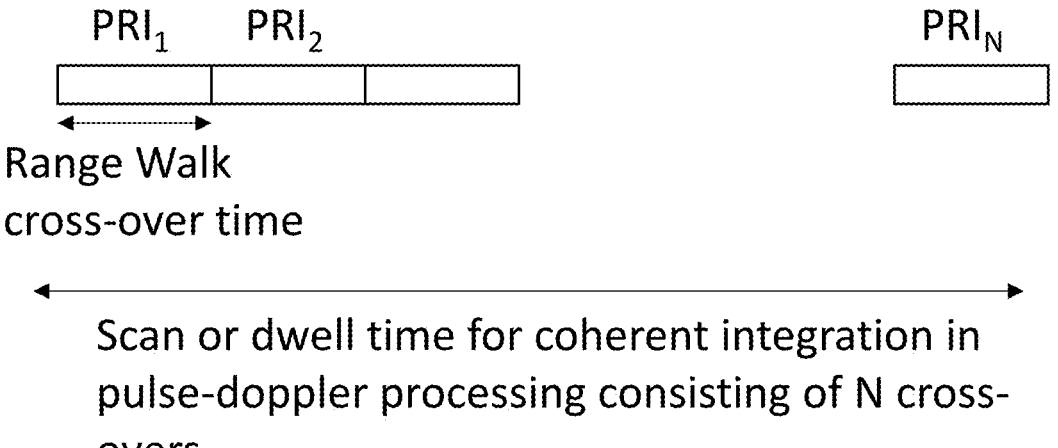
FIG. 12 illustrates an exemplary timeline of a radar scan consisting of a number of pulse repetition intervals in accordance with the present invention.

FIG. 12 illustrates an exemplary timeline of a radar scan that orders the range bin cross-over points in chronological order from left to right and labels them by PRI index. At $PRI_1$, the first cross over point occurs and this can be calculated as:

$$PRI_1 = \frac{RBS}{2v_{cd}T_p},$$

where $T_p$ is the PRI duration, and RBS is the range bin size.

Note that the PRI index is the range bin cross-over point measured by the PRI counts. It's not the PRI time duration as labeled by $T_p$.

Subsequent cross over points that occur at $PRI_n$ are defined by:

$$PRI_n = PRI_1 + \frac{RBS(n-1)}{v_{cd}T_p}.$$

Besides the NBS technique illustrated in FIG. 6, the NBS, N-tap block 606 also includes a read and filter technique: N-tap filter. For practical purposes, the number of taps is usually 2 ("2-tap filter"). For the positive Doppler velocity, illustrated in FIG. 7B, the 2-tap filter output is calculated as follows:

$$y(b,n)=c_0(n)x(b,n)+c_1(n)x(b+1,n),$$

where b is the range bin that transform is to read from, n is the PRI index, $c_0$ and $c_1$ are the 2-tap filter coefficients that are functions of n, x is the read data samples from RDC1 (602).

Although 2-tap filter coefficients are functions of the autocorrelation shape of the radar waveform, a preferred method to calculate the coefficients is to use the sin(x)/x, or sinc(x) function.

Due to range walking, the b index starts at the range bin of interest and would increment at each cross over point 802.

$$c_0=\text{sinc}(\pi d_0(n)\alpha),$$

where $\alpha$ is a scaling to adjust the mainlobe width of the sinc( ), RBS is range bin size, and $$d_0(n) = \text{mod}\left(\frac{(n-1)v_{cd}T_p}{RBS}, 1.0\right).$$

Then check if $d_0(n)>0.5$, set $d_0(n)=1-d_0(n)$ $$d_1(n)=0.5-d_0(n)$$

$$c_1=\text{sinc}(\pi d_1(n)\alpha).$$

The preferred configuration for $\alpha=1.1$.

Figure 9:
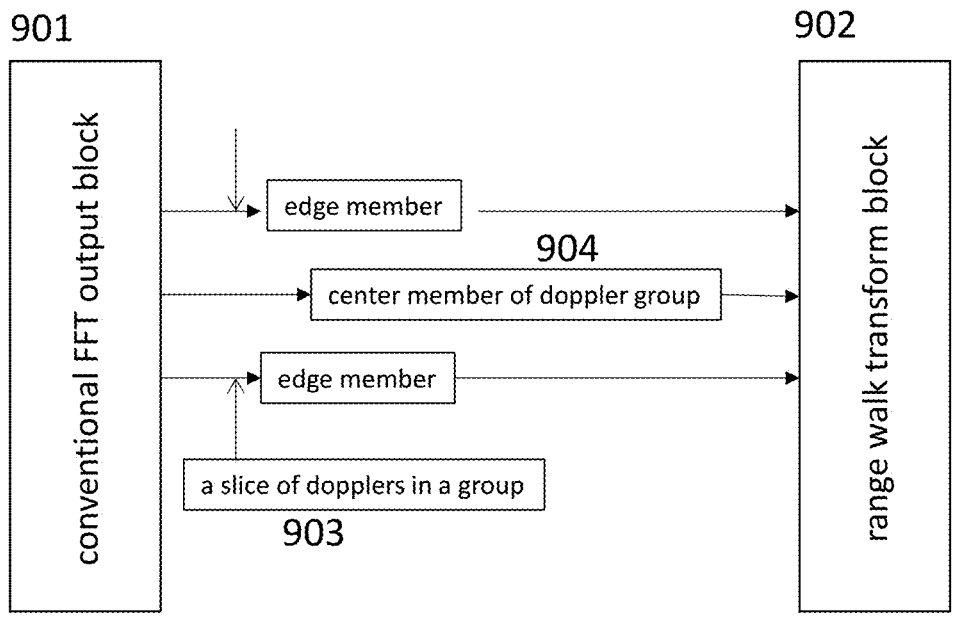
FIG. 9 is a diagram of an exemplary mapping of Doppler groups to the transformed output block when there is zero doppler adjustment before the range walk compensation in accordance with the present invention.

FIG. 9 illustrates an exemplary embodiment of the group index placement algorithm. The algorithm operates between the conventional FFT 901, and the output frame 902. For a given group, the frequency bin from the conventional FFT 901 is mapped one-to-one to the range walk output frame 902. This occurs for the special case when the Doppler adjust in the target 404 has zero-frequency. The number of conventional FFT output index that are mapped are those that are inside the grouping index as bounded by the slice of Dopplers in a group (903).

Figure 10:
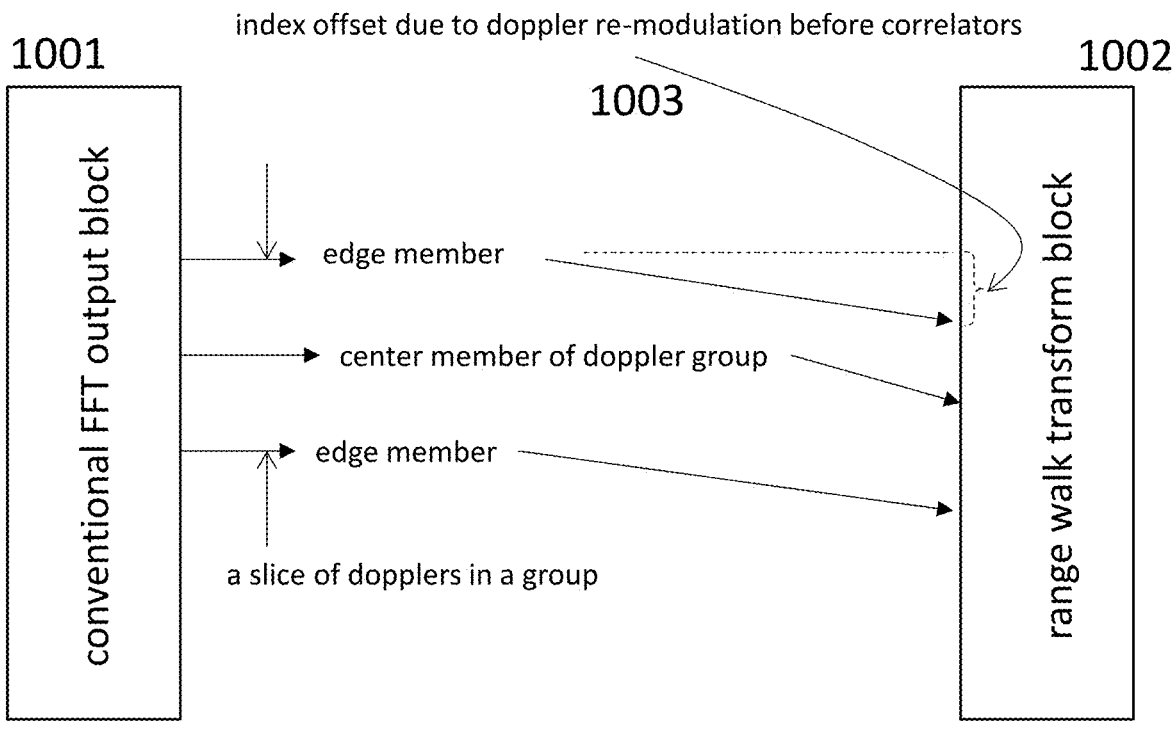
FIG. 10 is a diagram of an exemplary mapping of Doppler groups to the transformed output block when there is non-zero doppler adjustment before the range walk compensation in accordance with the present invention.

FIG. 10 illustrates an exemplary implementation of group index offset if the Doppler adjust in the target 404 (in FIG. 4A) is non-zero frequency. When the Doppler adjust is non-zero, each of the frequency bins from the conventional FFT are mapped to the range walk frame output by a fixed offset in accordance to the non-zero doppler frequency adjust.

The number of index to offset is given by:

$$k_{offset}=f_{offset}T_{dwell},$$

where $f_{offset}$ is the Doppler frequency adjustment used by the target 404.

In addition to the index offset, the corresponding velocity of the Doppler groups are also offset, given by:

$$v = \frac{(k-k_{offset})\lambda}{2T_{dwell}}.$$

This new velocity that has been offset by the Doppler adjustment must be substitute back to the equations illustrated in FIGS. 7A and 7B to calculate the new cross over points to determine the input samples to the conventional FFT (1001).

Figure 11:
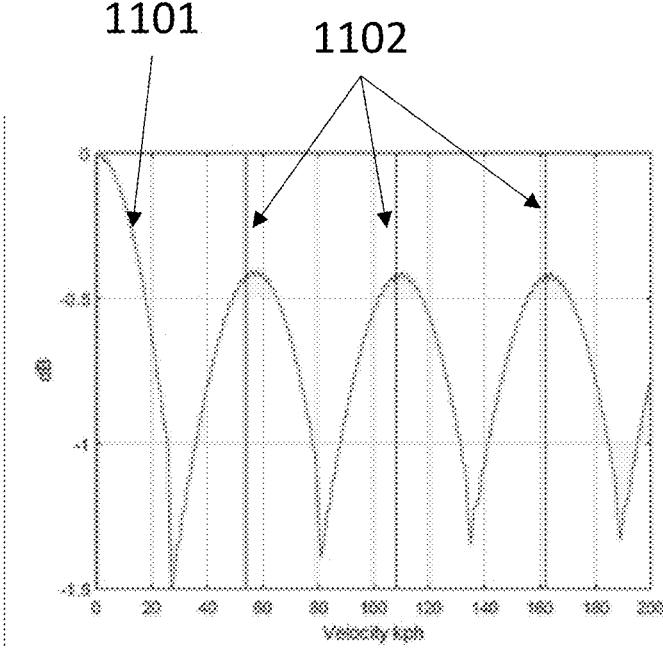
FIG. 11 is a diagram of an exemplary practical use of the range walk compensation that provides a reduction in performance losses for an exemplary radar system in accordance with the present invention.

FIG. 11 illustrates a practical use of such Range Walk Compensation. The lines indicated by 1102 are the center Doppler frequencies where the Doppler groups are formed. The curve 1101 is the relative SNR loss against moving targets of different velocities, as compared to if no range walk actually occurred and a zero-doppler coherent integration was done. Curve 1101 shows bigger losses at the edge lines between the Doppler groups and less loss at the center of the groups.

Thus, the exemplary embodiments discussed herein include an exemplary radar system that provides for improving a coherent integration gain of the radar system when a target velocity is sufficiently high enough such that range bin migration can occur during a radar scan. By apply a prediction of the range bin migration for each target Doppler, the losses of signal power as a result of range bin migration can be compensated for. The exemplary techniques may also include the creation of Doppler groups where only a single Doppler frequency in that Doppler group (usually a middle one) is used as a prediction of range bin migration or range walking. By creating Doppler groups, the total complexity of Doppler processing with range walk compensation can be reduced in accordance with the number of Doppler groups to create.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A radar system comprising:
a plurality of transmitters configured to transmit radio signals;
a plurality of receivers configured to receive radio signals that include radio signals transmitted by the transmitters and reflected from objects in an environment;
wherein at least one of the receivers of the plurality of receivers is operable to perform a range walk compensation for each range bin of a plurality of range bins that enhances coherent integration to reduce system loss by executing a plurality of FFTs for coherent integration of radar pulses for each respective range bin of the plurality of range bins, wherein the at least one of the receivers is operable to perform a separate FFT of the plurality of FFTs on each of a plurality of groups of radar pulses in each range bin of the plurality of range bins.

2. The radar system of claim 1, wherein the at least one of the receivers is operable to perform the range walk compensation by creating a plurality of Doppler groups for each range bin coherent integration, wherein the plurality of Doppler groups are the plurality of groups of radar pulses, with one FFT executed per Doppler group using the center group Doppler of each respective Doppler group to predict the change in range bins.

3. The radar system of claim 2, wherein the center group Doppler of a Doppler group is defined with respect to upper and lower Doppler boundaries of the Doppler group.

4. The radar system of claim 1, wherein the at least one of the receivers is operable to perform the range walk compensation by using a division factor, a fractional walk factor, to create a uniform group of Dopplers across the entire coverage of supported target velocities.

5. The radar system of claim 1, wherein the at least one of the receivers is operable to perform the range walk compensation using a nearest bin select or a 2-tap filter to filter the FFT input data as the predicted Doppler affects changes to range bins during a coherent integration time.

6. A method for controlling a radar system, the method including:
transmitting, with a plurality of transmitters, radio signals;
receiving, with a plurality of receivers, radio signals that include radio signals transmitted by the transmitters and reflected from objects in an environment; and
performing a range walk compensation for each range bin of a plurality of range bins to enhance coherent integration to reduce system loss by executing a plurality of FFTs for coherent integration of radar pulses for each respective range bin of the plurality of range bins, and performing a separate FFT of the plurality of FFTs on each of a plurality of groups of radar pulses in each range bin of the plurality of range bins.

7. The method of claim 6, wherein performing the range walk compensation comprises creating a plurality of Doppler groups for each range bin coherent integration, wherein the plurality of Doppler groups are the plurality of groups of radar pulses, with one FFT executed per Doppler group using the center group Doppler of each respective Doppler group to predict the change in range bins.

8. The method of claim 6, wherein performing the range walk compensation comprises using a division factor, a fractional walk factor to create a uniform group of Dopplers across the entire coverage of supported target velocities.

9. The method of claim 6, wherein performing the range walk compensation comprises using a nearest bin select or a 2-tap filter to filter the FFT input data as the predicted Doppler affects changes to range bins during a coherent integration time.

10. The radar system of claim 6, wherein the center group Doppler of a Doppler group is defined with respect to upper and lower Doppler boundaries of the Doppler group.

11. A radar system comprising:
a transmitter configured to transmit radio signals;
a receiver configured to receive radar signals that include radio signals transmitted by the transmitter and reflected from objects in an environment;
wherein the receiver is operable to perform range walk compensation for each range bin of a plurality of range bins that enhances coherent integration to reduce system loss by executing a plurality of FFTs for coherent integration of radar pulses for each respective range bin of the plurality of range bins, wherein the receiver is operable to perform a separate FFT of the plurality of FFTs on each of a plurality of groups of radar pulses in each range bin of the plurality of range bins.

12. The radar system of claim 11, wherein the receiver is operable to perform the range walk compensation by creating a plurality of Doppler groups for each range bin coherent integration, wherein the plurality of Doppler groups are the plurality of groups of radar pulses, with one FFT executed per Doppler group using the center group Doppler of each respective Doppler group to predict the change in range bins.

13. The radar system of claim 12, wherein the center group Doppler of a Doppler group is defined with respect to upper and lower Doppler boundaries of the Doppler group.

14. The radar system of claim 11, wherein the receiver is operable to perform the range walk compensation by using a division factor, a fractional walk factor, to create a uniform group of Dopplers across the entire coverage of supported target velocities.

15. The radar system of claim 11, wherein the receiver is operable to perform the range walk compensation using a nearest bin select or a 2-tap filter to filter the FFT input data as the predicted Doppler affects changes to range bins during a coherent integration time.

* * * * *